United States Patent [19]

Miller et al.

[11] Patent Number: 4,522,435
[45] Date of Patent: Jun. 11, 1985

[54] HOSE COUPLING JOINT

[75] Inventors: William P. Miller, Willowick; Atul Shah, Mentor, both of Ohio

[73] Assignee: Parker Hannifin Corporation, Cleveland, Ohio

[21] Appl. No.: 453,857

[22] Filed: Dec. 27, 1982

[51] Int. Cl.³ .......................... F16L 9/14; F16L 33/20
[52] U.S. Cl. ..................................... 285/256; 285/259
[58] Field of Search ................ 285/256, 259, 258, 347

[56] References Cited

U.S. PATENT DOCUMENTS

| 2,453,997 | 11/1948 | MacWilliam | 285/256 |
| 3,578,360 | 5/1971 | Eliot | 285/256 X |
| 4,039,212 | 8/1977 | Skarud | 285/347 X |
| 4,114,656 | 9/1978 | Kish | 285/256 X |
| 4,198,079 | 4/1980 | Shah | 285/259 X |
| 4,330,142 | 5/1982 | Paini | 285/256 |

FOREIGN PATENT DOCUMENTS

| 142779 | 4/1949 | Australia | 285/256 |
| 685353 | 4/1964 | Canada | 285/256 |
| 2506874 | 8/1976 | Fed. Rep. of Germany | 285/259 |
| 1400442 | 4/1965 | France | 285/256 |
| 1083741 | 9/1967 | United Kingdom | 285/256 |

Primary Examiner—Thomas F. Callaghan
Attorney, Agent, or Firm—Joseph B. Balazs

[57] ABSTRACT

A coupling joint for nylon-lined hose comprising a nipple having annular ribs thereon, an o-ring seal disposed in a groove between adjacent ribs and a metal sleeve crimped over the hose. The diameter of the ribs is greater than the ID of the hose requiring a forced insertion therein. The volume of the uncompressed seal is greater than the volume of the groove in which it is disposed. The crimps in the sleeve disposed over the ribs, place the inner liner into contact with the nipple for substantially the entire length thereof in gripping engagement with the ribs and compressing the seal completely into the groove.

9 Claims, 5 Drawing Figures

HOSE COUPLING JOINT

BACKGROUND OF THE INVENTION

This invention relates to couplings for flexible hose and more particularly to the type of coupling which is permanently attached to the hose, as by crimping.

Couplings for use with reinforced hose in conducting refrigerant fluid in automotive air conditioning systems are required to be compatible with specific materials forming the inner liner of the hose, provided primarily to control the effusion of refrigerant materials into the atmosphere. Nylon liners are one such device used in these air conditioner hoses.

An inner liner of nylon, while providing many attributes in compatibility and control of the refrigerant is especially difficult to grip and seal in a coupling. This is due to the fact that while nylon is somewhat elastic it has a high percentage of delayed recovery at low strain values. That is, the material takes a set in its formed state and tends not to return to its previous condition. This heat set characteristic of nylon acts to contravene the gripping and sealing forces imposed on the material in a crimped coupling resulting in unpredictable cold flow effects. These effects are accentuated in the automotive environment where wide temperature swings, high vibration and pullout forces are encountered.

One prior art solution is described in U.S. Pat. No. 2,453,997 where a massive rubber plug is employed to achieve a seal between the inner liner of refrigerant hose and the shank of a crimped coupling. In this arrangement it is specified that the maximum pressure exerted by the crimped sleeve should be applied over the seal and that preferably the seal is extruded axially into areas between the shank and inner liner. The lining of this hose is a compound of polyvinyl alcohol and due to the relatively uncontrolled deformation of the seal, does not provide a satisfactory coupling for automotive applications.

Another example of prior art coupling for air conditioner applications is described in U.S. Pat. No. 4,198,079 wherein the problem of the junction between the nylon inner liner of a hose and the nipple of a coupling is addressed. This coupling, however, is reusable, employing a nut with a special thread and does not have a separate seal element between the nipple and liner.

SUMMARY OF THE INVENTION

The hose coupling joint of this invention includes a tubular nipple having a pair of ribs thereon which is inserted into the end of a hose having a thermoplastic inner liner and a sleeve which is crimped over the hose to achieve gripping and sealing engagement. The ribs are ramp shaped annular barbs having a sharp inner edge of a diameter only slightly greater than the inside diameter of the hose. An o-ring seal is disposed in a groove between the barbs and is sized to be compressed substantially fully into the groove thereby to exert a controlled sealing force outwardly upon the inner liner and at a limited axial extent thereof. The crimp locations on the sleeve are selected to be preferably in axial alignment with the barbs and on either side of the seal so as to provide controlled compression of the hose in the critical sealing and gripping location.

DETAILED DESCRIPTION OF THE INVENTION

Figure 1:
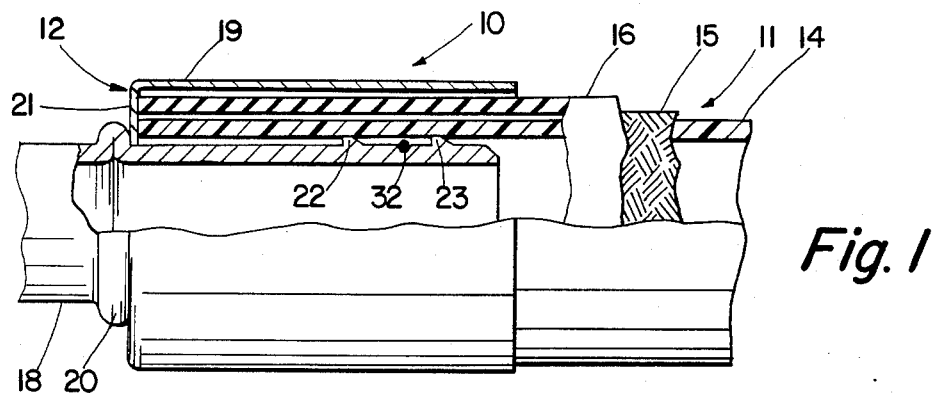
FIG. 1 is a partial section view showing the hose inserted into the coupling prior to crimping of the joint.

Referring now to the drawings, the hose coupling joint 10 comprises hose 11 and metal coupling 12. The hose 11 is conventional air conditioner hose having an inner liner 14 of thermoplastic material such as nylon. Over liner 14 is a reinforcement layer 15 which may be a braided or spirally wrapped layer or layers of stranded material such as polyester or polyamide. Over the reinforcement layer 15 is a sheath or cover 16 which may be a relatively thick layer of synthetic rubber or other suitable thermoplastic material. The liner, reinforcement and cover of hose 14 are typically bonded to one another to provide an integral and yet flexible hose structure.

The coupling 12 consists of nipple 18 and sleeve 19 as separate elements assembled as a unit prior to makeup of the joint as shown in FIG. 1 Nipple 18 is preferably formed of aluminum being generally of tubular configuration and axially upset in a prior forming operation to provide an outwardly protruding bump 20 thereon. Sleeve 19 is formed of steel or other suitable material and includes end wall 21 having an opening therein for receipt of the nipple 18, being positioned adjacent bump 20. Hose 11 is received in the annular space between sleeve 19 and nipple 18.

Figure 3:
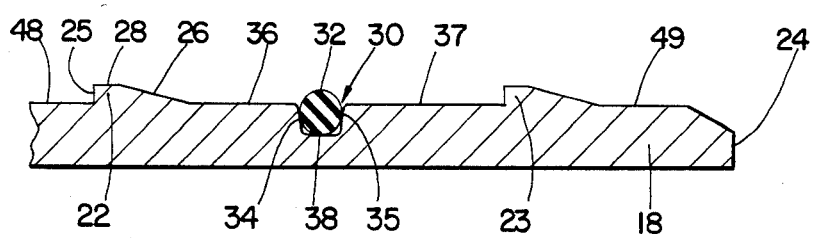
FIG. 3 is an enlarged partial section view of the nipple portion of the coupling.

As seen more clearly in FIG. 3, nipple 18 includes inner and outer annular ribs 22, 23 spaced a short distance from the outer end 24 of nipple 18. The outer end 24 is beveled to assist in receipt of hose 11. The ribs 22, 23 are identical in configuration in the shape of ramplike barbs having a radially-extending inner shoulder 25, a conical outer surface 26, forming a ramp and a short cylindrical surface 28 therebetween. The axial length of cylindrical surface 28 is on the order of the radial length of shoulder 25 and the intersection therewith provides a sharp edge.

An annular groove 30 is formed in nipple 18 substantially centrally of ribs 22, 23 and an o-ring seal 32 is disposed in the groove 30. Groove 30 has slightly sloping inner and outer walls 34, 35 intersecting the inner and outer cylindrical surfaces 36, 37 of nipple 18, and a cylindrical bottom wall 38 between sloping walls 34, 35. The intersection between each wall 34, 35 and bottom wall 38 is a radius on the order of 0.020 inch, thereby forming a somewhat rounded groove 30 with limited affect upon the strength of nipple 18 in that location. O-ring 32 is disposed in groove 30 and as seen in FIG. 3 in the uncompressed condition has a volume greater than the volume of groove 30 as defined by the walls 34, 35, 38 and nipple surfaces 36, 37. The axial length of groove 30, between walls 34, 35 is substantially the same as the cross-sectional diameter of o-ring 32, while the radial depth of the groove 30 is such that o-ring 32 projects outwardly from the nipple surfaces 36, 37. The outward projection of o-ring 32 is less than the radial height of ribs 22, 23 from nipple surfaces 36, 37. Stated in another way, the OD of the uncompressed o-ring 32 is less than the OD of the ribs 22, 23. Preferably, the OD of the ribs 22, 23 is only slightly greater than the ID of the hose inner liner 14, while the OD of nipple outer surfaces 36, 37 is slightly smaller than the OD of the hose liner 14. The radial height of ribs 22, 23 is on the order of one-half the thickness of the inner liner 14 of hose 11. Preferably, o-ring 32 is stretched fairly substantially to secure same in groove 30. O-ring 32 is of Buna-N material formulated for refrigerant applications, but may be of other materials.

The dimensions of the elements forming the joint 10 are quite critical due to the relatively non-accommodating characteristics of the hose inner liner 14 which is considerably different from the characteristics of synthetic rubbers which are used as liners or cores of many fluid coupling joints. For a five-eighths inch hose 11 in which the ID of the liner 14 is 0.625 inch nipple surfaces 36, 37 would be on the order of 0.615 inch OD while cylindrical surfaces 28 of ribs 22, 23 would be at 0.660 inch OD. In this embodiment o-ring 32 is of 0.458 inch ID by 0.053 inch thickness (cross sectional diameter) and disposed in a groove 30 having bottom wall 38 at 0.555 inch diameter.

As seen in FIG. 1, joint 10 is initially assembled by insertion of nipple 18 into hose 11. Because of the interference fit with ribs 22, 23, and non-compliance of liner 14, the nipple must be forcibly inserted and this is continued until the end of hose 11 engages end wall 21 of sleeve 19, and the end wall 21 engages the bump 20. Sleeve 19 is dimensioned so that hose 11 enters therein relatively freely. In this condition hose inner liner 14 is supported slightly away from outer surfaces 36, 37 of nipple 18 but may be in contact with o-ring 32.

Figure 2:
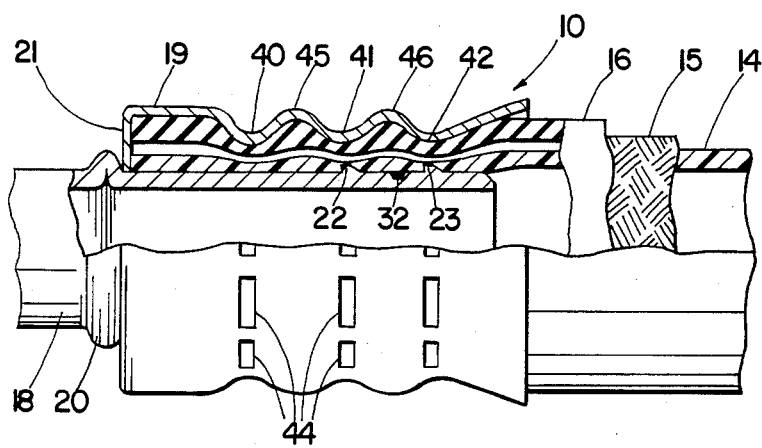
FIG. 2 is a partial section view of one embodiment of the crimped joint.
Figure 4:
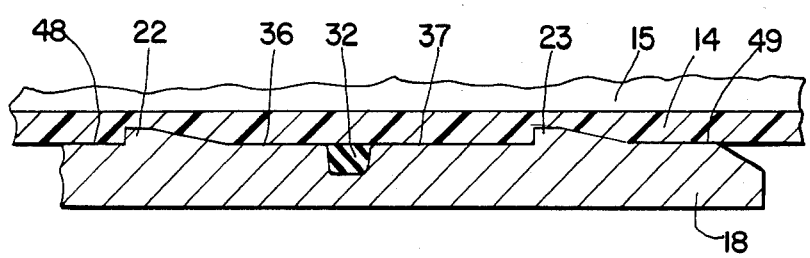
FIG. 4 is an enlarged partial section view of the nipple portion of FIG. 3 in a crimped joint.

FIG. 2 and FIG. 4 in enlarged detail depict the completed joint 10 after sleeve 19 has been deformed inwardly to secure the inserted hose 11. This deformation is preferably performed by radially inwardly crimping sleeve 19 by means of a circular array of die segments. In the embodiment of the invention depicted, three substantially equally axially spaced crimps 40–42 are made in sleeve 19, each crimp 40–42 being a substantially circular depression circumscribing the sleeve 19 and being effected by circumferentially and axially spaced generally rectangular arcuate segments 44. Between the crimps 40–42, the metal of the sleeve 19 is left unrestrained and this then is drawn into gently curved sections 45, 46.

In the preferred embodiment of the invention, crimps 41, 42 are located in substantial axial alignment with ribs 22, 23 thereby greatly compressing the materials forming the hose 11 at these locations. It has been determined that the axial location of the crimps 41, 42 relative to ribs 22, 23 is not extremely significant and substantial leeway in either axial direction can be tolerated. What appears to be significant however, is that crimps 41, 42 straddle o-ring 32 so that some portion of curved section 46 of sleeve 19 is generally over o-ring 32. While curved section 46 is unrestrained some radial compression of this portion of sleeve 19 occurs due to draw down by adjacent portions so that compression of the hose 11 thereunder occurs. At the same time extrusion of the materials forming hose 11 from the areas under the crimp 41, 42 occurs into the area under curved section 46, causing compression at this location.

As best seen in FIG. 4, such compression of the hose 11 causes the inner liner 14 to be placed into intimate contact with all outer surfaces of nipple 18, including those surfaces 36, 37 adjacent o-ring 32, as well as nipple surfaces 48, 49 inwardly and outwardly of ribs 22, 23, respectively. Preferably all nipple surfaces 36, 37, 48, 49 are of the same diameter. In such compression, liner 14 extends substantially in a straight line from surface 36 to surface 37, compressing o-ring 32 substantially completely into groove 30 and completely filling the groove. Such o-ring 32 compression provides an effective sealing force upon liner 14 in a very localized area, while engagement with the sharp edges of ribs 22, 23 provides an effective grip upon the hose.

Figure 5:
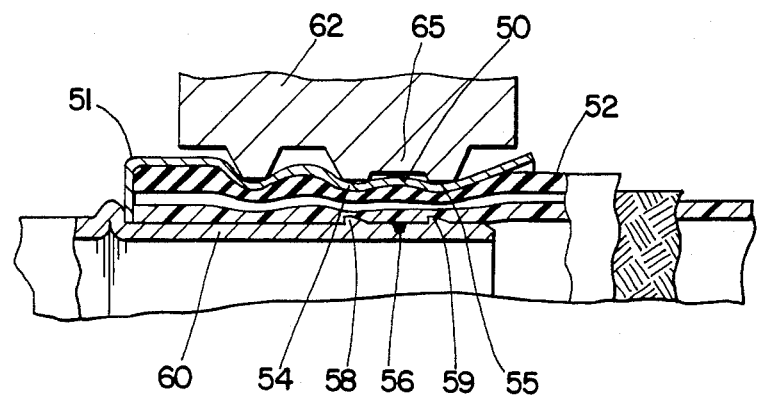
FIG. 5 is a partial section view of a second embodiment of the crimped joint, shown in relation to a crimping die.

FIG. 5 depicts another embodiment of the invention in which the curved section 50 of a sleeve 51 is restrained to provide a modified compression of the hose 52 thereunder. In this arrangement crimps 54, 55 again straddle o-ring 56, the latter being disposed between ribs 58, 59 of nipple 60, however the curved section is deformed radially inwardly to a greater extent and substantially as far radially inwardly as the crimps 54, 55. This is readily effected by selection of crimp die segments 62 which have the typical rectangular segmented crimp shape, but with a fillet 65 between adjacent crimp fingers to shape the sleeve 51 accordingly.

We claim:

1. A hose coupling joint, comprising a hose having a thermoplastic liner, an inner tubular member, a seal on said tubular member, and a sleeve deformed into engagement with said hose for establishing a fluid-tight connection between said hose and said seal, said inner tubular member having annular barbs thereon and a groove intermediate adjacent ones of said barbs, said seal being disposed in said groove, said hose being in engagement with said seal, said barbs and said tubular member intermediate said barbs, said tubular member having outer cylindrical surfaces between said barbs and on inner and outer axial sides of said barbs, each said barb having a sharp inner edge, a conical outer surface and a generally cylindrical rib surface therebetween, said seal being elastomeric and having a volume substantially equal to the volume of said groove so as to substantially completely fill said groove when compressed and project substantially no further radially outwardly than said tubular member cylindrical surfaces between said barbs, said seal projecting no further radially outwardly than said cylindrical rib surfaces prior to assembly, said cylindrical rib surfaces being disposed radially outwardly substantially one half the thickness of said hose liner, and said sleeve being a metal collar having a pair of axially spaced, ring-like crimps straddling said seal for compressing said hose into engagement with said barbs and said seal.

2. The hose coupling joint of claim 1 wherein said tubular member cylindrical surfaces are of substantially equal diameter and said hose is in engagement with said tubular member for substantially the entire length of all said surfaces.

3. The hose coupling joint of claim 1 wherein said hose comprises an inner liner of thermoplastic material, a reinforcement layer and an outer cover of elastomeric material.

4. The hose coupling joint of claim 3 wherein said inner liner is nylon.

5. The hose coupling joint of claim 4 wherein said hose comprises a polyester reinforcement and a rubber cover.

6. The hose coupling joint of claim 1 wherein said sleeve includes a further deformed ring portion between said pair of crimps, and further deformed ring portion being of a predetermined diameter greater than the diameter of said crimps to provide controlled force upon said seal.

7. The hose coupling joint of claim 1 wherein said seal is an o-ring seal.

8. The hose coupling joint of claim 1 wherein said inner tubular member comprises a bumped portion thereon formed by axially upsetting said tubular member and said sleeve comprises an end wall in engagement with said bumped portion.

9. The hose coupling joint of claim 1 wherein said pair of ringlike crimps are in axial alignment over said annular barbs.

* * * * *